(12) United States Patent
Poloni et al.

(10) Patent No.: US 7,476,033 B2
(45) Date of Patent: Jan. 13, 2009

(54) SUPPORT BEARING FOR A ROLL

(75) Inventors: Alfredo Poloni, Fogliano Redipuglia (IT); Andrea De Luca, Remanzacco (IT); Ivan Paiaro, Ronchi Dei Legionari (IT)

(73) Assignee: Danieli & C. Officine Meccaniche S.p.A., Buttrio (IT)

( * ) Notice: Subject to any disclaimer, the term of this patent is extended or adjusted under 35 U.S.C. 154(b) by 312 days.

(21) Appl. No.: 10/573,392

(22) PCT Filed: Sep. 30, 2004

(86) PCT No.: PCT/EP2004/052380

§ 371 (c)(1),
(2), (4) Date: Mar. 23, 2006

(87) PCT Pub. No.: WO2005/031178

PCT Pub. Date: Apr. 7, 2005

(65) Prior Publication Data

US 2007/0003176 A1    Jan. 4, 2007

(30) Foreign Application Priority Data

Sep. 30, 2003  (IT) .......................... RM2003A0447

(51) Int. Cl.
*F16C 35/00*    (2006.01)
*F16C 13/00*    (2006.01)
(52) U.S. Cl. ...................... 384/418; 384/192
(58) Field of Classification Search ................ 384/276, 384/286–292, 317, 372, 377–378, 416–419, 384/192; 277/510–511, 516; 74/424.6, 424.52, 74/424.88, 424.75; 474/103–105
See application file for complete search history.

(56) References Cited

U.S. PATENT DOCUMENTS

| | | | | |
|---|---|---|---|---|
| 1,961,029 A | * | 5/1934 | Benedek | ...................... 384/287 |
| 3,460,184 A | * | 8/1969 | Dyer | ........................... 15/320 |
| 3,796,471 A | | 3/1974 | Holm | |
| 4,337,699 A | * | 7/1982 | Beisel | ........................ 101/348 |
| 4,799,657 A | * | 1/1989 | Miller | ......................... 269/24 |
| 5,072,689 A | | 12/1991 | Nakagawa et al. | |
| 5,099,780 A | | 3/1992 | Nappier et al. | |
| 5,230,285 A | * | 7/1993 | Cogswell et al. | ............ 101/363 |
| 5,549,393 A | | 8/1996 | Morando | |
| 5,947,610 A | * | 9/1999 | Feldbauer et al. | ........... 384/123 |

(Continued)

FOREIGN PATENT DOCUMENTS

DE          4207034          9/1993

(Continued)

*Primary Examiner*—Marcus Charles
(74) *Attorney, Agent, or Firm*—Stetina Brunda Garred & Brucker

(57) ABSTRACT

Support bearing for a roll (33) for immersion in liquid metal, comprising an internal rotating bush (31) fitted coaxially on a pin (32) at the end of the roll (33), and rotating inside an external bush (34) fixed to a supporting arm (37) of the roll (33). The first bush (31) is provided with an axial helical groove (39) on its outer surface and the second bush (34) is provided with a toroidal-shaped convex outer surface to allow rotation without friction inside the cylindrical ring of the supporting arm (37).

4 Claims, 8 Drawing Sheets

U.S. PATENT DOCUMENTS

| | | | |
|---|---|---|---|
| 6,065,876 A | 5/2000 | Suhara et al. | |
| 6,484,599 B2 * | 11/2002 | Blaurock | 74/424.75 |
| 6,736,748 B2 * | 5/2004 | Schneider et al. | 74/52 |
| 6,834,862 B2 * | 12/2004 | Wilkinson | 277/510 |
| 2003/0111777 A1 | 6/2003 | Morando | |

FOREIGN PATENT DOCUMENTS

| | | |
|---|---|---|
| DE | 19511943 | 10/1996 |
| FR | 771406 | 10/1934 |
| JP | 10317119 | 12/1998 |
| JP | 2002 241915 | 8/2002 |
| SU | 1663257 A * | 7/1991 |

* cited by examiner

SUPPORT BEARING FOR A ROLL

FIELD OF THE INVENTION

The present invention refers to a support bearing for rolls adapted to operate immersed in liquid metals, in particular for metal strip galvanising or aluminising systems.

STATE OF THE ART

One of the processes to which metal strips are subjected is galvanising or aluminising, which is performed, according to a known technique, by passing the strip through a molten zinc or zinc-aluminium bath contained in a tank. The strip enters the molten bath from the top of the tank at an angle and comes out from the tank in a vertical direction. To divert strip path a roll is used which must be removable to allow maintenance and the insertion of new metal strips. To allow removal and insertion of said roll from/into the tank two arms are provided that support the roll at the ends. The roll is connected to the arms by means of bearings fixed rigidly in bearing supports, tightened by tie rods. The bearings, generally friction bearings, which are located inside the above-mentioned supports, bear the radial load due to the tension of the strip, while the forces in the axial direction are countered by plates, integral with the arms, on which the roll end rests.

In these bearings a serious problem is their rapid wear which, in addition to requiring frequent replacements, with stoppage of the system, causes instability of the roll with consequent non-uniform thickness of the layer of zinc or zinc-aluminium that is deposited on the strip. The wear of the bearings is linked above all to the difficulty of organising effective lubrication and cooling of the contact surfaces of the mobile parts of the bearing using traditional lubricants, due to the high temperatures of the metal in which the roll is immersed. In any case this type of lubrication is complex and unreliable.

A solution to this problem is to provide for lubricating and cooling of the bearing using the molten metal of the bath itself. In this case, however, the wear on the bearings is rapid due to the high loads applied to the strip combined with the high temperatures developed in the contact area.

A further problem with these rolls is misalignment of the supports that sustain the rolls due to the deformations to which the supporting arms are subject due to the sudden changes of temperature resulting from immersion and emersion of the roll into/from the molten metal bath. The consequence of this is the occurrence of a contact between the parts involved which is not distributed throughout the length of the bearing, but is localised in a smaller area, with consequent local wear on the parts.

A further drawback in addition to that of misalignment as described above, aggravating the effects of it, is deformation of the roll itself during operation of the system due to the high tension in the strip.

A further problem with these bearings is the corrosion caused by the metal of the bath, which attacks the surfaces of the immersed parts, in particular of the bearings, creating particles of intermetallic compounds such as Fe, Zn and Al.

A further problem with these bearings is due to the impurities present in the bath, also called dross. These are partly caused by corrosion of the immersed parts and partly by the pieces of metal detached for friction of the bearing contact surfaces. These particles, which tend to increase over time, get in the space between the moving surfaces of the bearings and act like an abrasive powder, and in some cases this leads to seizure of the roll.

At present some types of bearings are known, designed to help solve the above-mentioned problems.

In a first state-of-the-art solution, shown in FIG. 1, the bearing consists of two sectors 10 and 11 in an alloy of tungsten-chromium-cobalt, known as stellite, welded to the support 14 of the roll 15 in the direction of the load, and a bush 12. The bush 12 is also made of stellite and is fixed by welding on the end pins 13 of the roll. The two sectors 10, 11 do not have the same angular opening: it is wider for sector 10 which sustains the load due to the pull on the strip and narrower for sector 11, the purpose of which is only to sustain the weight of the roll during immersion and emersion operations. Between the bush 12 and the sectors 10 and 11 a diametrical clearance of 6 mm is provided to compensate for the misalignments of the supports and deformation of the shaft, and to ensure that the impurities present in the bath do not cause seizure of the roll. This solution has the following disadvantages:

stellite, in addition to being an expensive material which is difficult to manufacture, has a different linear expansion coefficient from the steel on which the sectors are welded so that, once the roll is immersed, tensions are produced in the weldings causing their breakage;

the considerable clearance between bush 12 and sectors 10 and 11 does not favour either the stability of the roll, with the consequences already referred to, or lubrication by the molten metal, as the pressures produced in the bearing tend to expel it;

the particles of impurity can remain trapped between the bearing contact surfaces and therefore increase wear on the bearing.

A second proposal of the known state of the art is illustrated by FIG. 2. The bearing consists of three ceramic inserts 16 arranged in the direction of the load acting on the bearing, which are in contact with a bush 17 fitted on the end pins 18 of the roll 20. The ceramic inserts are fitted inside recessings purposely provided in the support 19 and fixed by means of a wedge system.

Although this solution has some advantages, for example the increased stability of the roll as the bearing wears, as there are three contact points, it is not satisfactory for the following reasons:

there is no lubrication of the contact areas by the molten metal, as the shape of the inserts does not allow the liquid to remain in the contact area;

the wear is not uniform throughout the length of the inserts as the bearing does not allow compensation of the misalignments and of the deformation of the roll. In addition, the ceramic material is expensive.

The document U.S. Pat. No. 5,549,393 describes a bearing, shown in FIG. 3, consisting of a surface-hardened steel rotating bush 21 fitted on the end pins 22 of the roll 23, and an outer bush 24, in graphite, in its turn fitted on a semi-spherical support 25. The support 25 is free to rotate, for a limited angle, inside a seat consisting of two internally semi-spherical elements 26 and 27, which allow the aforesaid rotation, a spacer 28 and a retaining ring nut 29; said elements are integral with the support 30.

The advantage of this solution lies in the fact that the outer bush 24 can rotate together with the support 25, and therefore allows the roll to compensate for the misalignments of the support seats and the deformation of the roll when loaded and therefore ensures uniform longitudinal wear of the bearing; nevertheless, a number of drawbacks remain:

lubrication by the molten metal is poor, as there are no elements for bringing the molten metal into the contact area;

the impurities can remain trapped between the bearing contact surfaces and therefore wear increases on the bearing;

rotation of the roll end is by sliding on the contact surface between the support 25 and the two rings 26 and 27, with consequent generation of resistance due to the friction between the two surfaces. The sliding friction prevents the natural alignment of the roll.

SUMMARY OF THE INVENTION

An aim of the present invention is therefore to solve the above-mentioned problems by producing a roll support bearing adapted to work immersed in a metal bath, with limited cost, having a reduced wear consequently prolonging the working life of the system.

A further aim of the invention is to produce a bearing with improved lubrication and which allows optimal axial rotation of the roll in extreme working conditions with reduction of critical situations.

These problems are solved by means of a support bearing for roll, adapted to be immersed in a liquid metal bath, defining a first rotation axis, comprising a first bush, fitted coaxially on pins at the end of a roll and with substantially cylindrical outer surface, a second bush fixed to a supporting element of the roll, wherein the first bush is held inside the second bush rotatingly around the axis, wherein the second bush has an outer convex surface defining a toroidal surface characterised in that the first and second bush define, during operation, a reciprocal contact surface throughout their common length, the second bush is positioned inside a retaining ring of the supporting element, the retaining ring having a substantially cylindrical inner surface whereby the bearing is suitable to rotate, substantially without friction, around a second axis orthogonal to the first axis.

Thanks to the innovative characteristics of the present invention, the bearings are simple to produce, stable during operation and have a longer working life.

Preferred embodiments of the invention are described in the dependent claims.

LIST OF THE FIGURES

Further advantages that can be obtained with the present invention will become clearer, to a person skilled in the art, from the following detailed description of non-restrictive embodiment examples of a roll support bearing with reference to the following Figures, in which.

DETAILED DESCRIPTION OF THE INVENTION

Figure 1:
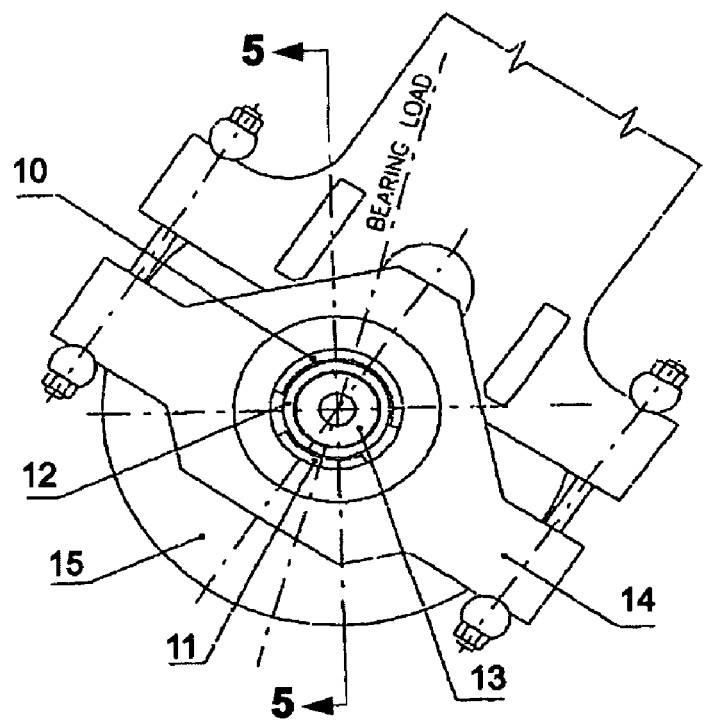
FIG. 1 shows a side view of a bearing of the known state of the art.
Figure 2:
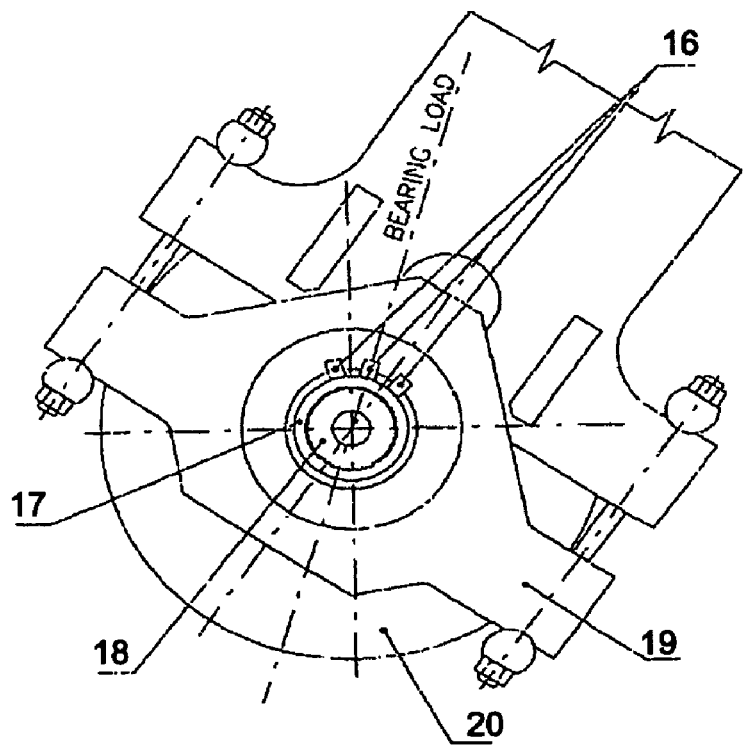
FIG. 2 shows a side view of another bearing of the known state of the art.
Figure 3:
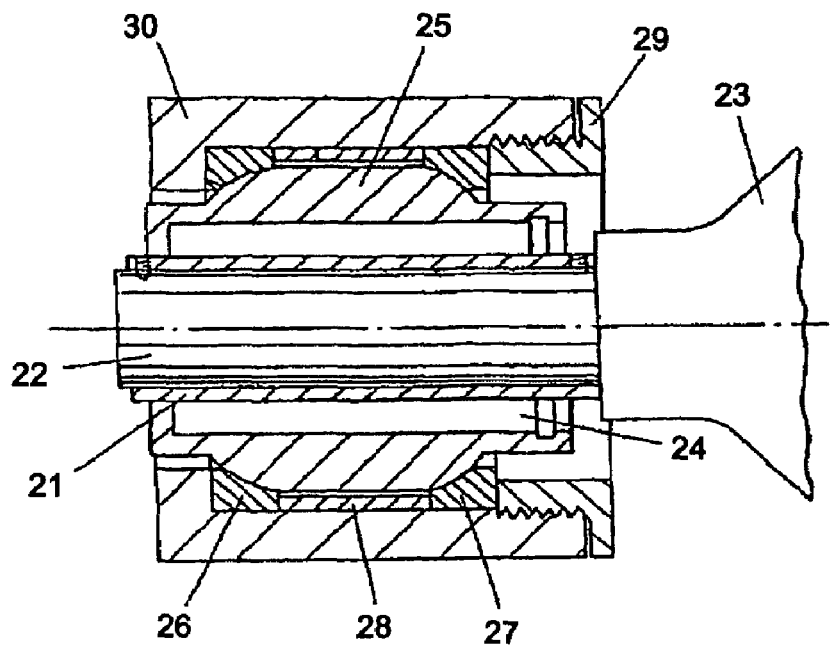
FIG. 3 shows a section of another bearing of the known state of the art.
Figure 5:
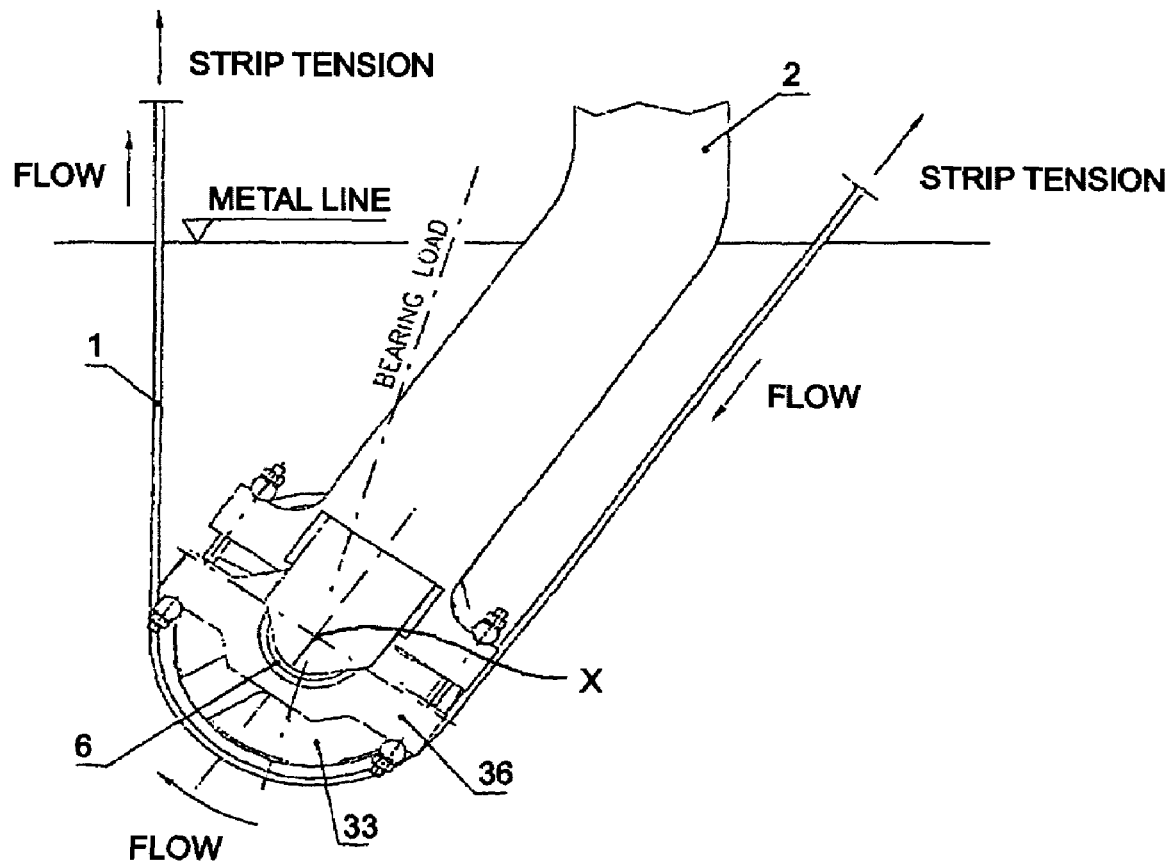
FIG. 5 shows a section view according to plane 5-5 of the roll of FIG. 1.
Figure 4:
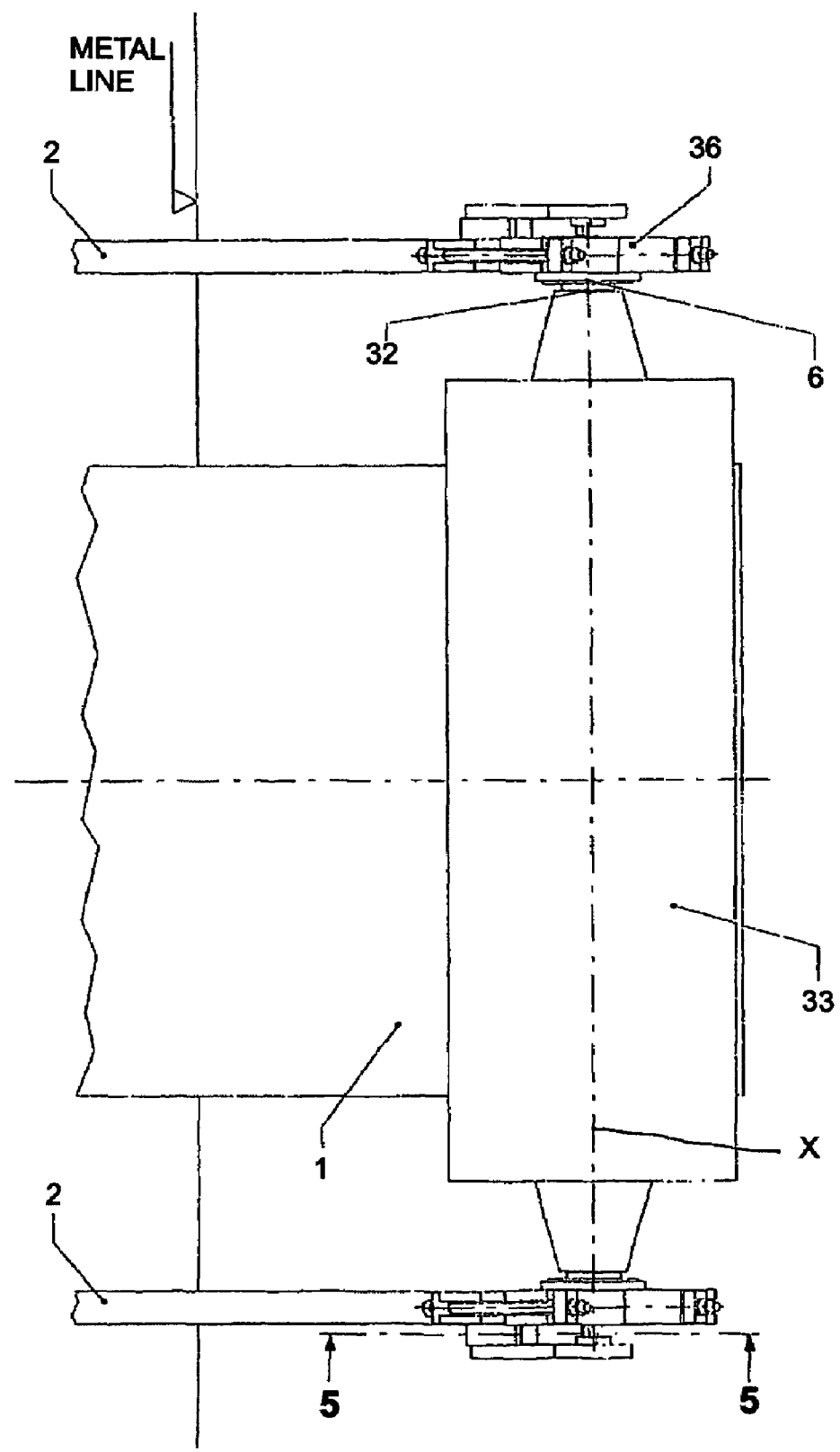
FIG. 4 shows a view of a strip idler roll with which bearings according to the invention are used.
Figure 6:
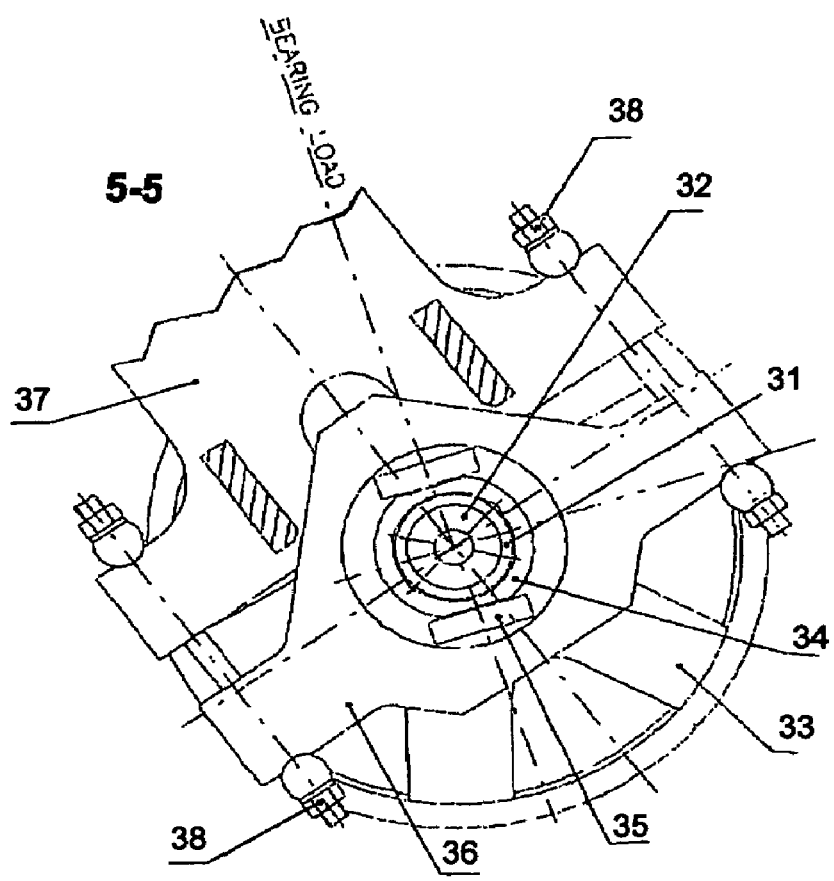
FIG. 6 shows a side view of a support bearing according to the invention.
Figure 7:
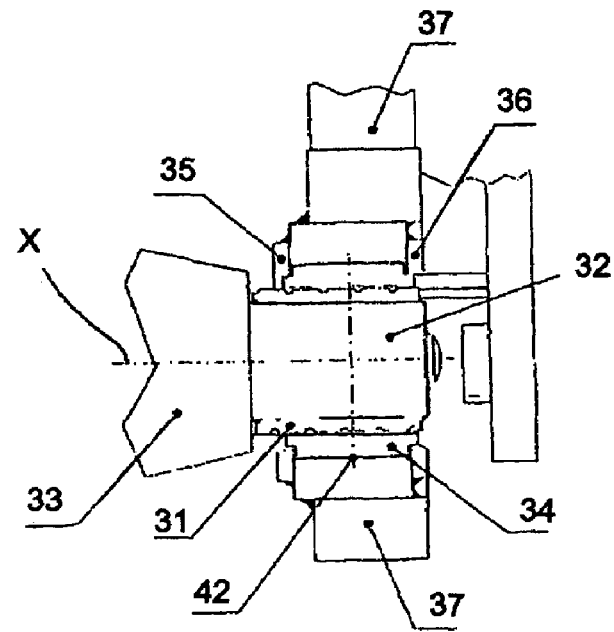
FIG. 7 shows a section according to an axial plane of the bearing of FIG. 6.
Figure 8:
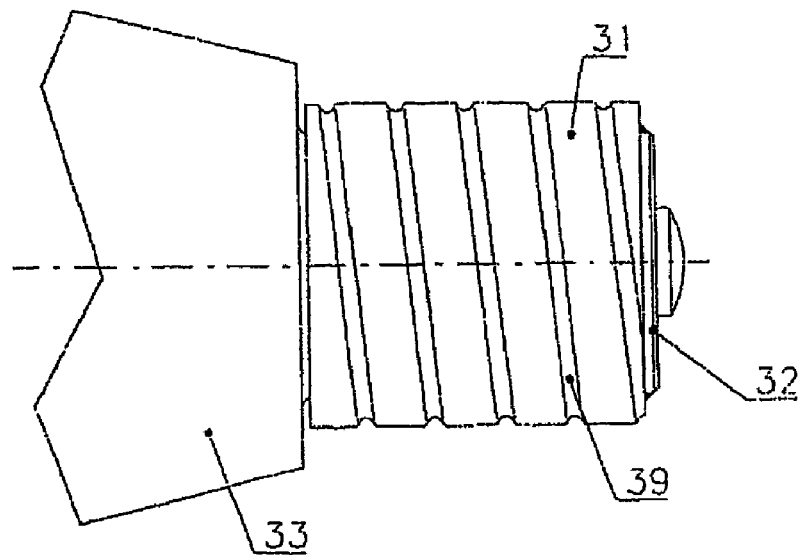
FIG. 8 shows a side view of a detail of the bearing of FIG. 6.

FIGS. 4 to 9 show a idler roll 33 for a metal strip 1 during galvanising and zinc-aluminising during which it is immersed in a metal bath. The roll 33 is sustained by a bearing 6 according to the invention which comprises a first rotating bush 31 fitted on pins 32 at the end of a roll 33. The bearing also comprises an external bush 34, stationary with respect to bush 31, fitted inside a retaining ring of the bearing support 36; the external bush 34 is kept in place by plates 35 welded on the support 36. The support 36 is rigidly connected to the arm 2 by means of a supporting flange 37 tightened to the arm by means of two tie rods 38.

A helical groove or channel 39, which rotates together with the roll 33, is provided on the rotating bush 31. The function of the groove is to convey the molten metal to the bearing contact area, thus increasing the lubricating and cooling effect provided by the molten metal, and to allow removal of the impurities there present, thereby reducing the wear due to said impurities.

The external bush 34 is provided with longitudinal axial grooves 40, 41, 44, 45 on the inner surface which is in contact with the outer surface of the first rotating bush 31. The external bush 34 is also provided with a swelling 42 on the outer surface, thus defining a substantially toroidal surface, i.e. the mean radius of the swelling in the longitudinal direction is much larger than the distance between the bearing axis and the outer surface.

The presence of the helical groove 39 on the first rotating bush 31 and the longitudinal grooves 40 and 41 on the external bush 34 allow, as illustrated above, a reduction of the wear on the bearing due to the following phenomenon: the groove 39 allows expulsion of the particles in suspension in the bath which have got between the contact surfaces 43 of the bushes and the grooves 40 and 41, and the introduction of molten metal which acts not only as a lubricant but also as a coolant. In fact, a good circulation of metal inside the bearing improves cooling of the bearing because the temperatures to which the bearing is brought, as a result of the friction between the bushes which occurs under a high tension load, are higher than the temperature of the molten metal in which the bearing is immersed.

The external bush 34 is cylindrical on the internal diameter to guarantee the maximum sliding coupling surface and is convex on the outer surface to guarantee self-alignment—adjustability—of the bearing. Since the bearing is self-aligning, it is no longer necessary to provide space for the misalignments via the clearance between the internal bush 31 and the external bush 34; with the solution proposed, therefore, the clearance between the bushes can be reduced to values equal to or below 1 mm. This improves the contact area, the wear on the length of the bearing and, consequently, the stability of the roll 33.

Figure 9:
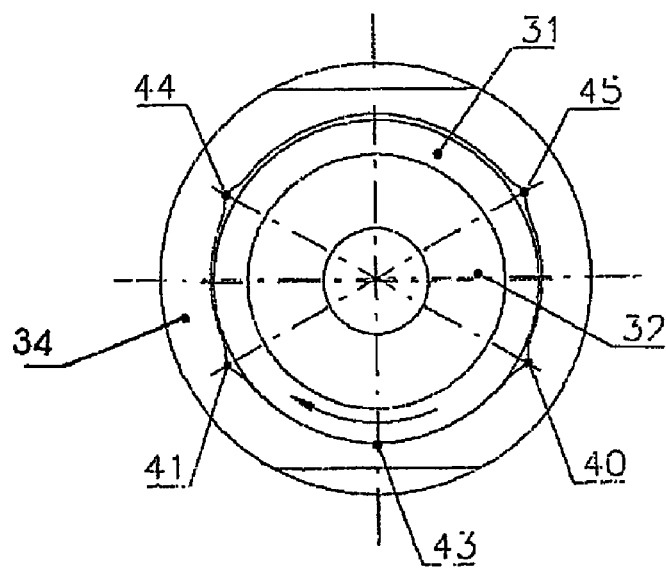
FIG. 9 shows a side view of a detail of the bearing of FIG. 6.

According to the rotation direction, as illustrated in FIG. 9, the longitudinal groove 40 is positioned before the contact area 43 between the two bushes 34 and 31 in order to create an accumulation of liquid metal, which is used for lubricating and cooling, while the longitudinal groove 41 is located after the above-mentioned area in order to create an area from which the metal, once it has finished its lubricating and cooling function, can easily flow out at the side of the bearing.

Once the bearing is worn, the external bush 34 can be rotated of 180° and re-used; after rotation the grooves 44 and 45 have the same function as the grooves 40 and 41. This doubles the working life of the external bush 34.

The swelling 42 of the external bush 34 has the function of allowing adjustment of the bearing in order to compensate for the misalignments of the supports and the deformation of the roll 33 due to deflection under load. As the external bush 34 with toroidal swelling is fitted inside a retaining ring of the support 36 which is internally cylindrical, the bearing is adjusted by means of a pure rolling movement, without friction. This ensures a better distribution of the loads on the common contact surfaces of the internal bush and external bush; furthermore the contact area between the surfaces remains constant whatever the direction of the roll rotation axis.

The material used for construction of the two bushes 31 and 34 has an expansion coefficient similar to the stainless steel with which roll and supports are constructed, thus eliminating the problems of breakage of the weldings; it is also less expensive than stellite and ceramics.

Plates 35 are provided to prevent the bearing axially coming out of its seat and the rotation of the bearing in its seat.

From this description it is clear that the bearing of the invention achieves the preset objectives and offers a series of important advantages summarised below:

it provides maximum sliding coupling surface and self-alignment of the parts; it produces uniform wear along the length of the bearing with consequent improved stability of the roll; it guarantees reduced wear on the bearing; it eliminates the problems of breakage of the weldings; production is inexpensive and it guarantees a longer working life, at least twice as long.

Figure 10:
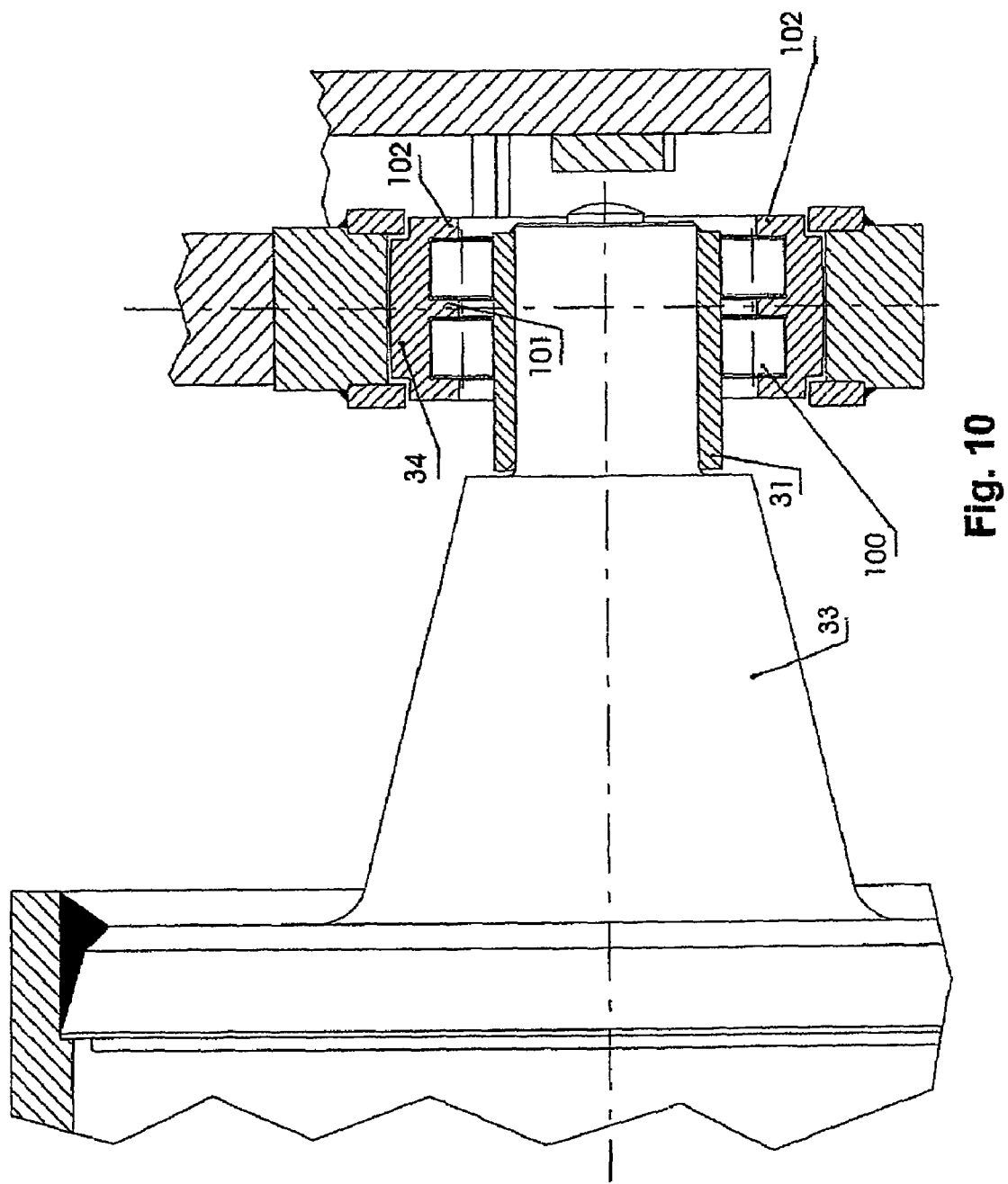
FIG. 10 shows a section view of another embodiment of the bearing according to the invention.
Figure 11:
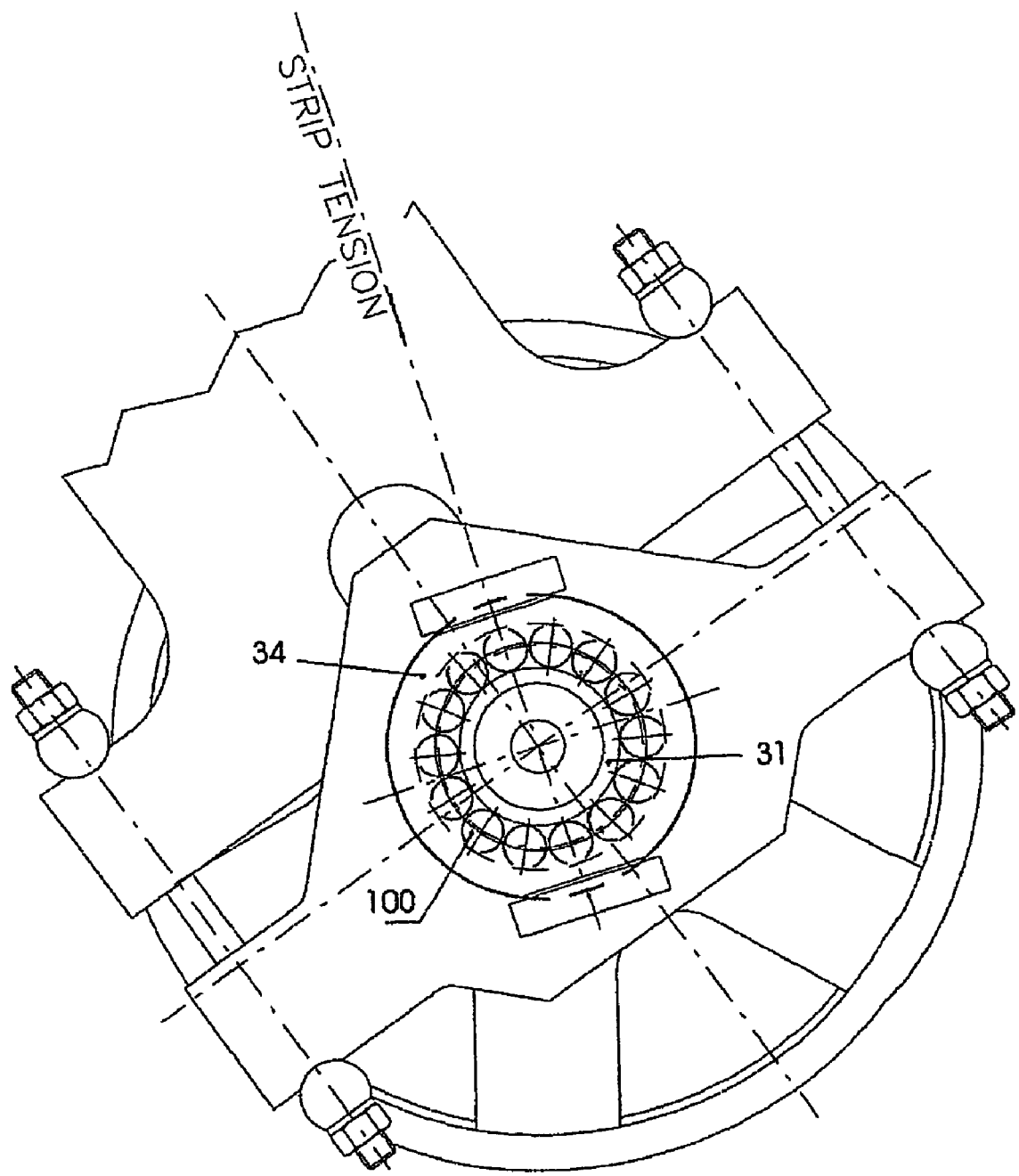
FIG. 11 shows a side view of the bearing of FIG. 10.

Advantageously another embodiment of a roll support bearing according to the invention is provided with at least one row or crown of rollers 100, in reciprocal contact among them along respective generatrix, placed between the internal bush 31 and the external bush 34. In the FIGS. 10 and 11 the bearing is provided with two crowns of rollers 100 and the internal surface of the bush 34 has a shape suitable to house the rollers 100. In particular, the external bush 34 presents a central ring wall 101, with the function of separating the two crowns of rollers, and two end rims 102 for laterally retaining the rollers 100. The central ring wall 101 and end rims 102 define seats, called "races" or "runways", that keep in place the rollers 100. Therefore there is no need for an apposite cage for retaining the rollers.

Advantageously the internal surface of the races is provided with a series of circular or helical grooves to facilitate removal of impurities from contact surface with the same rollers.

Rollers 100 preferably have a squat shape, i.e. they have a relatively large diameter and a short rotation axis. Infact, as there is a clearance in the seats, it must be avoided that a small rotation of a roller around a radial axis orthogonal to the race, in the sense of a "sway", could cause underpinning of the same roller in the race with consequent seizure of the bearing, as a consequence of the wedging of the roller between the end rim and the central ring wall. Therefore the ratio between diameter "d" and length of a roller 100 is about equal to 1, preferably comprised between 0.7 and 1.2.

Figure 12:
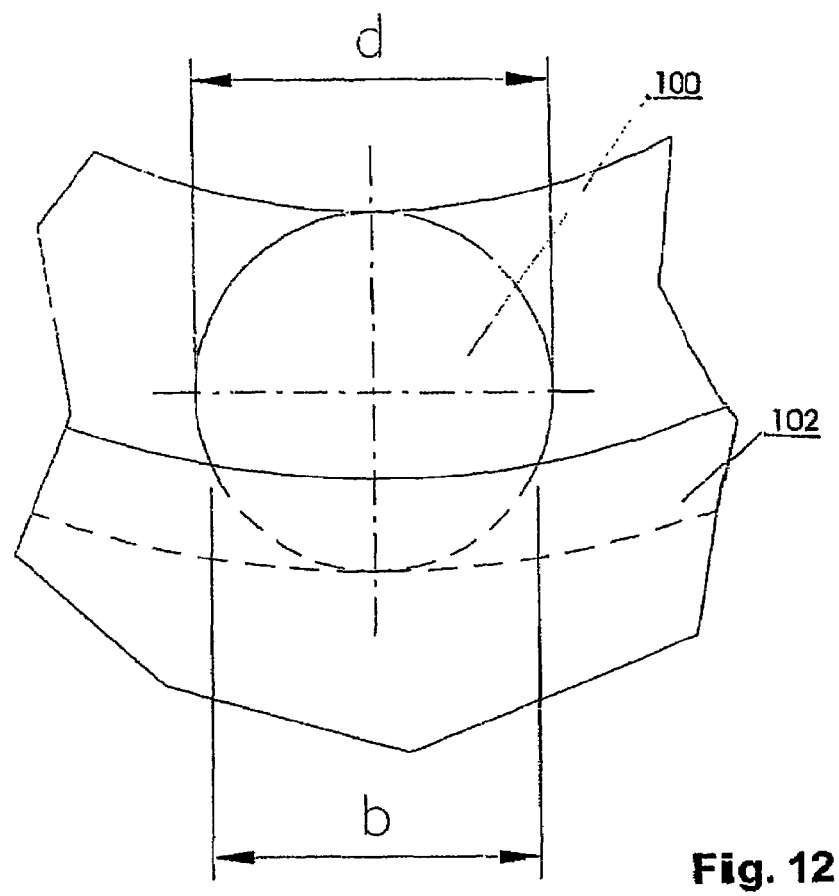
FIG. 12 shows an enlarged side view of a detail of the bearing of FIG. 10.
Figure 13:
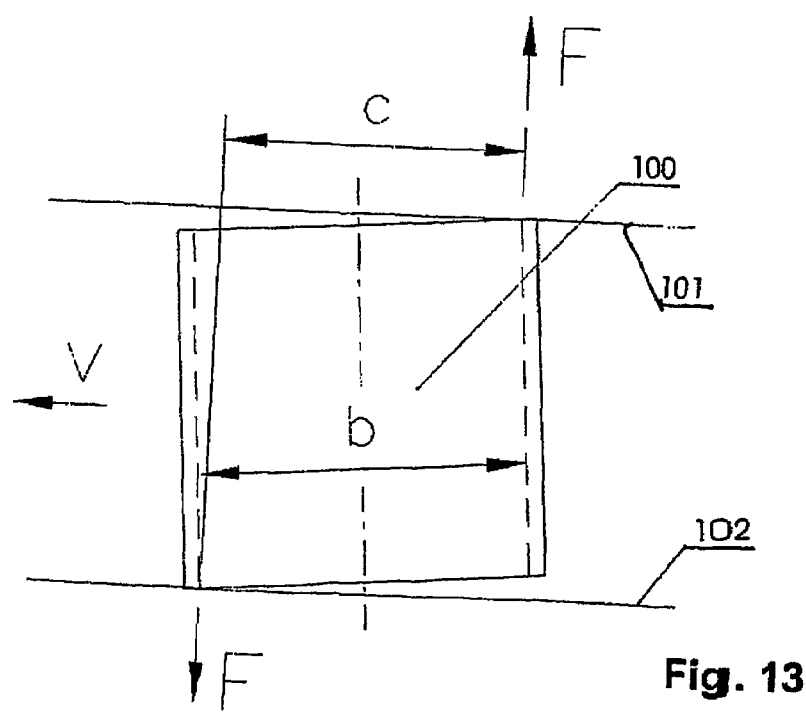
FIG. 13 shows an enlarged elevation view of a detail of the bearing of FIG. 10.

Furthermore the height of the central ring wall 101 and that one of the end rims 102 is preferably such that the more distant contact points between the roller on one side and end rim 102 and central ring wall 101 on the other side, when a roller is subject to a small sway, have a maximum distance, as shown in FIG. 13. This sway can be caused for instance by impurities present on the race during bearing operation. This means that, with reference to FIG. 12, the distance "b" should preferably be as close as possible to the diameter "d" of a roller. In this way the lever "c" between the underpinning or wedging forces F is maximised whereby, with equal sway torques, said underpinning forces F are minimised.

In this embodiment the crowns of rollers 100 preferably are in number ranging from one to four.

The advantages of a support bearing with rollers crowns are that:

the bearing can bear greater loads up to about six tons;
the bearing working life is double and at least equal to that one of the immersed roll 33, i.e. about one month;
the rollers 100 and races geometry ensures a high stability of the same rollers and consequently a lower bearing wear;
higher strip speed (about 30%).

The invention claimed is:

1. Support bearing for a roll, adapted to be immersed in a liquid metal bath, defining a first rotation axis, comprising a first bush fitted coaxially on pins at the end of a roll and with substantially cylindrical outer surface, a second bush fixed to a supporting element of the roll wherein the first bush is held inside the second bush rotatingly around the axis, wherein the second bush has an outer convex surface defining a toroidal surface wherein the first and second bush define, during operation, a reciprocal contact surface throughout their common length, the second bush is positioned inside a retaining ring of the supporting element, said retaining ring having a cylindrical inner surface whereby the bearing is suitable to rotate, substantially without friction, around a second axis orthogonal to the first axis characterised in that the first bush has at least one axial helical groove on the outer surface and the second bush has one or more substantially axial longitudinal grooves on the inner surface.

2. Device according to claim 1, wherein a first of said longitudinal grooves is positioned before the reciprocal contact surface in order to create an accumulation of liquid metal, suitable for lubricating and cooling, and a second of said longitudinal grooves is positioned after said reciprocal contact surface.

3. Device according to claim 1, wherein the second bush is kept in place by plates welded to a bearing support.

4. Device according to claim 1, wherein the clearance between the first bush and the second bush is less than 1 mm.

* * * * *